Dec. 20, 1955      C. F. RAUEN      2,727,603
BRAKE AND STOP MECHANISM
Original Filed Sept. 6, 1940
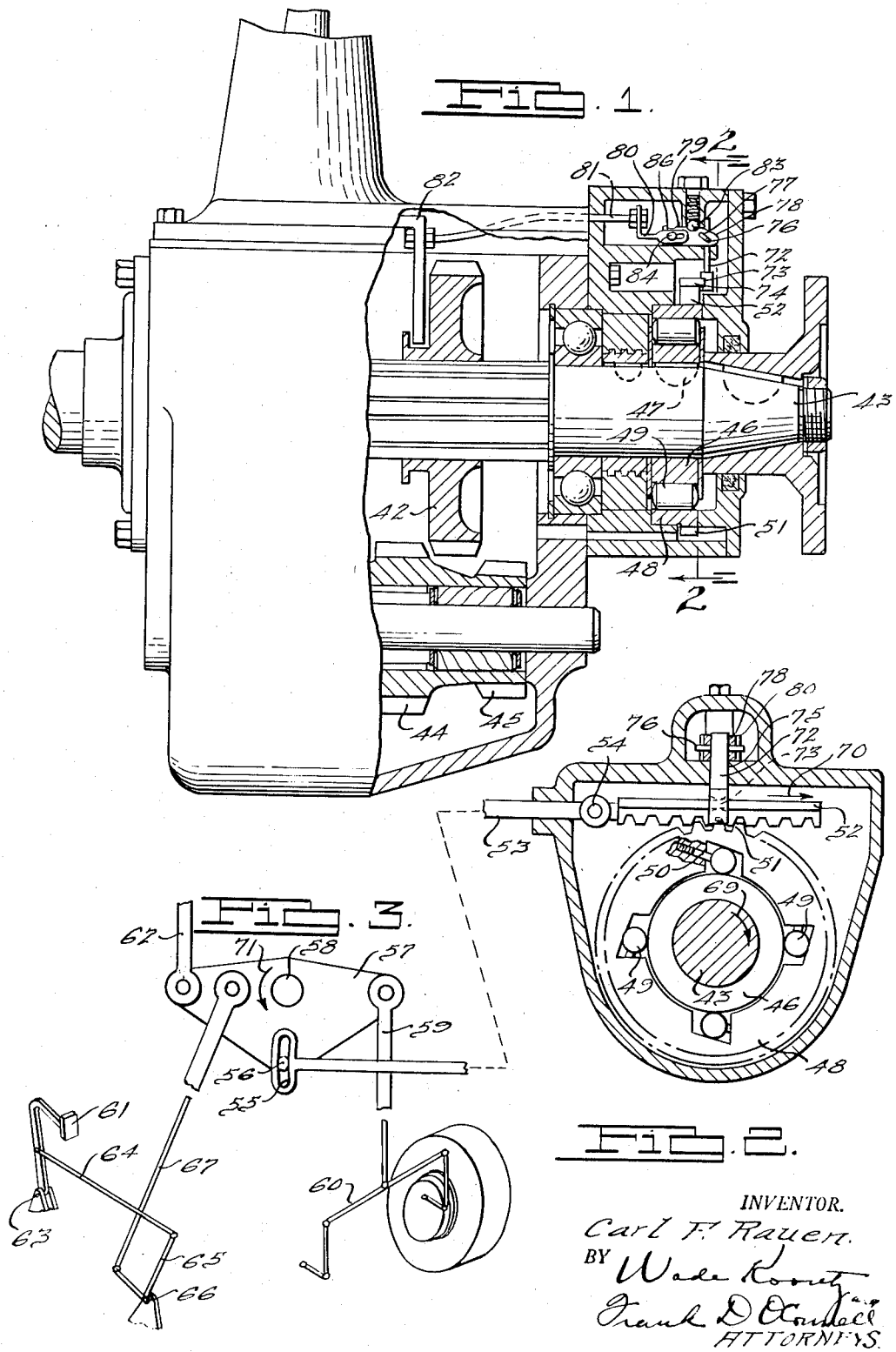
INVENTOR.
Carl F. Rauen.
BY
ATTORNEYS.

United States Patent Office 2,727,603
Patented Dec. 20, 1955

2,727,603

BRAKE AND STOP MECHANISM

Carl F. Rauen, Grosse Pointe, Mich.

Original application September 6, 1940, Serial No. 355,656, now Patent No. 2,609,901, dated September 9, 1952. Divided and this application August 6, 1952, Serial No. 303,018

14 Claims. (Cl. 192—4)

(Granted under Title 35, U. S. Code (1952), sec. 266)

The invention described in the following specification and claims may be manufactured and used by or for the Government for governmental purposes, without the payment to me of any royalty thereon.

The object of this invention is to provide a means to automatically prevent retrograde movement of a motor vehicle when it is desired to drive that vehicle up a grade. Such devices are sometimes referred to as sprags.

One way of accomplishing this is to provide a one-way clutching or brake actuating device mounted on the driven or propeller shaft of the transmission which will cause application of the brakes when the car tends to roll backwards down a hill against the will of the operator.

The foregoing one-way device can be connected either to the wheel brakes or to the brake which is sometimes placed on the propeller shaft and commonly operated by the hand brake lever.

Since the one-way device for operating the brakes is put on the driven or propeller shaft of the transmission, a means must be provided to release it when it is desired to drive the car in reverse. I have shown one means of doing this in this application and have shown several other methods in my copending applications, Serial No. 491,837, filed October 29, 1930, now Patent No. 2,299,765, and Serial No. 355,656, filed September 6, 1940.

A further object of this invention is to provide, in a motor vehicle, a mechanism which will automatically keep the brakes applied after the vehicle is stopped by manual application of the brakes, until released by application of the engine power to the drive system or until released by an auxiliary means preferably manually controlled.

Another object of the invention is to provide means for easily overcoming the frictional force set up between the several parts of a sprag mechanism when this latter is employed for holding the vehicle in a stationary position upon an inclined surface such as a hill, so that any desired change in the gear ratio may be effected.

Another object of the invention is to provide a simple and effective means for preventing movement of the automobile or other device in which a transmission is used, in a direction opposite from that desired.

Other and important objects of the invention will be apparent from a consideration of the following specification taken in conjunction with the accompanying drawings of which there is one (1) sheet and wherein:

Fig. 1 is a view of a conventional motor vehicle transmission, partly in section, equipped with a device embodying my invention for actuating the wheel brakes by the main shaft of the transmission;

Fig. 2 is a sectional view on the line 2—2 of Fig. 1;

Fig. 3 is an extended view of Fig. 2 and illustrating the connection of the mechanism shown therein to the brake system of the motor vehicle.

In Figs. 1, 2 and 3, I have shown a device mounted on the driven or main shaft 43 of the transmission and at the rear thereof. The low and reverse gear 42 is slidably mounted on the main shaft 43 and is adapted to be slid into mesh with the countershaft low gear 44 and with the reverse idler gear (not shown) which meshes with the gear 45. The gear 42 is the conventional low and reverse sliding gear and the gears 44 and 45 are part of the conventional countershaft gear cluster. The main shaft 43 is provided with a one-way roller clutch drum 46 keyed to the shaft 43 at 47. The clutch cam member 48 is prevented from turning counterclockwise, as seen in Fig. 2, with respect to the drum 46, by the rollers 49 which are operatively arranged between the cam member 48 and the drum 46. These rollers are held in position for instant action by the spring plungers 50.

The cam 48 is provided with gear teeth 51 adapted to mesh with similar teeth on the rack 52, which rack is pivoted on the rod 53 at 54. The rod 53 at its other end is provided with a slot 55 which receives a pin 56 carried by a bell crank member 57, the bell crank 57 being pivotally mounted about the point 58. A brake rod 59 having a pivotal connection at one end thereof to the bell crank 57 is connected at the other end thereof to an equalizing bar 60 which is connected by linkage to the rear wheel brakes for actuating the same upon operation of a foot pedal 61. Another brake rod 62 having a pivotal connection at one end thereof to the bell crank 57, is connected at its other end to an equalizing bar (not shown), which in turn is connected to the front wheel brakes for actuating the same upon operation of the foot pedal 61. The foregoing linkage when operated by the foot pedal 61, will apply the brakes and if the vehicle is at rest, the one-way roller clutch 46, 48, 49 and 50 will maintain the brakes applied as more fully described hereinafter. The foot brake 61, which is pivotally mounted at 63, is connected by a link 64 to a bell crank 65 pivoted at 66, said bell crank in turn being connected by a rod 67 to the bell crank 57 for moving the same about its pivot point 58 upon actuation of the foot pedal 61.

It will therefore be seen that when the shaft 43 rotates in the direction of the arrow 69, the rack 52 will be caused to move in the direction of the arrow 70, which will cause the bell crank 57 to rotate in the direction of the arrow 71 and apply the brakes through the rods 59 and 62. As soon as the shaft 43 is rotated opposite to the arrow 69, the pull on the rod 53 is eliminated by reason of the one-way clutch, and the cam 48 is returned to its normal position under the influence of the usual brake springs.

In order that a car equipped with this device on the propeller shaft may be driven backwardly, I provide a means for lifting the rack 52 from contact with the gear teeth 51 so that the cam member 48 may turn in a clockwise direction, looking at Fig. 2, with the shaft 43. This is accomplished preferably by the gear shift mechanism when the gears are shifted to reverse, as will now be described. A member 72 is provided with a slot 73 adapted to engage the stepped part 74 of the rack member 52. The slot 73 is rounded so that the stepped part 74 can rock when the member 72 is moved vertically in the hole 75 in which it slides. A pin 76 extends from both sides of the member 72 and protrudes through the slots 77 in the arms 78 of the forked detent member 79 which straddles the member 72. Straddling the member 79 is a part 80 fastened to an extension 81 of the shift member 82 which controls the position of gear 42 for either low or reverse drive. The spring pressed ball 83 forms a detent which holds the rack 52 in its proper position when the transmission is in forward or reverse speeds. The bifurcated end of the member 80 which straddles the detent member 79 has a slot formed in each furcation thereof, and a pin 84 carried by the detent member 79 extends through said slots so as to provide a lost motion connection between the member 80 and the detent member 79.

When the transmission is shifted to reverse, the member 80 cooperating with the pin 84 pushes the arms 78 to the right, in Fig. 1, raising the pin 76 in the slot 77 and thereby causing the member 72 to lift the teeth on the rack 52 out of mesh with the teeth 51 of the cam member 48. When the teeth on the rack 52 are out of mesh with the teeth 51, they are held from re-meshing by the action of the members 81 and 82, the member 82 of the transmission normally being held in the position in which it may be set, by means of conventional detents (not shown). The teeth of the rack 52 will remain out of mesh with the teeth 51, even when the member 82 is actuated to shift the gear 42 to a neutral position between the gears 44 and 45, due to the fact that the right hand end of the slots into which the pin 84 extends will not contact the pin 84 upon shifting from reverse back to neutral. This is done so that the sprag device cannot be reset and suddenly stop the car or break some of the parts if the gear 42 should be pulled out of reverse position while the car is moving backwardly at any appreciable speed.

When the gear 42 is shifted into mesh with the gear 44 (low gear) through the medium of the shift fork 82, the right hand end of the slots in the member 80 contacts the pin 84 and pulls the forked detent 79 to the left until it assumes the position shown in Fig. 1, thereby permitting the teeth of the rack 52 to mesh with the teeth 51. Inasmuch as it is quite difficult to mesh the gears 42 and 44 if the car is moving backwardly at any appreciable speed, the above arrangement, by which it is necessary to shift the gear 42 into mesh with the gear 44 before the sprag again becomes effective, will make sudden strains on the car mechanism practically impossible. The detent ball 83 will prevent the slots 77 from being moved to the right (Fig. 1) under force of the member 72 resulting from the separating action of the gear teeth when the sprag is in action. It is well known that when gear teeth are in action or where a gear and a mating rack are in action that there is a small component of the torque force in the gear which, due to the "pressure angle" of the gear teeth will force the mating teeth out of mesh unless provision is made to hold the teeth in mesh. In the case of a gear and pinion the usual bearings perform this function; in the case of a gear and rack as illustrated in Figs. 1 and 2, the spring pressed detent ball 83, seating in the notch in the detent member 79 maintains the teeth of the rack 52 in mesh with the teeth of the gear 48 against the separating force set up when the mechanism is maintaining the brakes applied or when the brakes are automatically applied by the mechanism due to unauthorized backward movement of the vehicle down a hill. It will therefore be seen that when it is desired to shift the transmission to reverse gear, the device can readily be released when the same is under the maximum load of the vehicle by the operator exerting enough force on the shaft fork 82 and the detent member 79 to disengage the ball detent 83 from the notch in which it seats, formed in the member 79. The force that must be exerted by the operator in shifting to reverse when the device is under the maximum load of the vehicle is relatively small and is only slightly more than the force required to shift to reverse if the vehicle was not equipped with my device. This is due to the fact that since the separating force on the rack is a small percentage of the torque force in the gear when the mechanism is under the maximum load of the vehicle, and since the force on the ball detent due to the separating force of the gear teeth is still further considerably reduced due to the small angle of the slots 77, the spring urging the ball detent into its seat in the detent member 79 is relatively light, hence the force required to be exerted by the operator when shifting to reverse is only slightly more than required if the vehicle were not equipped with my device. Furthermore, the load on the gear and rack teeth due to automatic operation of the brakes when the vehicle tends to roll backwardly down a hill, or due to the mechanism maintaining the brakes applied, if applied when the vehicle is at rest can be entirely removed by applying the brakes by means of the pedal 61, to a point just past that point to which they had previously been applied either by manual or automatic operation.

To prevent accidental displacement of the member 79 (and consequent reengagement of the teeth of rack 52 with teeth 51) when the gear 42 is shifted from reverse to a neutral position, the member 79 may be provided with a second notch 86 positioned so as to engage the detent 83 when the gear 42 is shifted to reverse.

When the brakes are applied by the pedal 61, so as to bring the vehicle to rest, rack 52 is moved to the right, looking at Fig. 2, which causes the outer member 48 of the overrunning clutch to rotate clockwise and relative to the shaft 43 and drum 46. Rollers 49, backed up by the outer spring pressed plungers 50, move so as to follow the outer member 48 so that the member 48 will not rotate counterclockwise relative to the shaft 43 and drum 46 when the brake pedal is released after the vehicle is at rest. The wheel brakes, therefore, in consequence of their operation by the foot brake pedal 61, will remain applied and hold the vehicle against movement in both directions, even after the brake pedal 61 is released, and while the vehicle is so held, the gears of the transmission may be shifted. Driving of the vehicle forwardly will cause counterclockwise rotation of shaft 43 and drum 46, and the rollers 49 to move out of wedging engagement with member 48 and the release of the usual brake springs, which will result in the automatic release of the wheel brakes when the vehicle is driven forwardly.

This application is a division of my co-pending application, Serial No. 355,656, filed September 6, 1940, for "Brake and Stop Mechanism," now Patent No. 2,609,901 issued September 9, 1952, as a continuation in part of my prior co-pending applications, Serial No. 491,837, filed October 29, 1930, for "Means for Preventing Retrograde Movement of Motor Vehicles and the Like," now Patent No. 2,299,765; Serial No. 498,263, filed November 26, 1930, for "Brake," now abandoned; Serial No. 230,641, filed September 19, 1938, for "Sprag," now Patent No. 2,296,619; and Serial No. 689,204, filed September 13, 1933, for "Sprag," now Patent No. 2,251,956, and contains subject matter originally presented in the above mentioned application, Serial No. 498,263, now abandoned.

While my invention has been illustrated and described, it is to be understood that many modifications may be made in the construction thereof without departing from the scope of the invention, and for that reason I do not desire to be limited to any particular form or arrangement, except insofar as such limitations are included in the following claims.

I claim:

1. In a motor vehicle having a brake, a transmission including a shaft, an overrunning clutch carried thereby, said clutch including an overrunning part constituting a pinion, brake operating instrumentalities including a shiftable rack for cooperating with said pinion, whereby, when the transmission is set for driving the vehicle in one direction and the vehicle starts to move in the opopsite direction, said clutch will cause said pinion to move said rack and thereby operate the brake to check such movement of the vehicle.

2. In a motor vehicle having a brake, a transmission including a shaft, an overrunning clutch carried thereby, said clutch including an overrunning part constituting a pinion, brake operating instrumentalities including a shiftable rack for cooperating with said pinion, whereby, when the transmission is set for driving the vehicle in one direction, and the vehicle starts to move in the opposite direction, said clutch will cause said pinion to move said rack and thereby operate the brake to check such movement of the vehicle, gear shifting means for said transmission, and mechanism associated with said rack and said means for withdrawing said rack out of engagement with said pinion when the transmission gearing is shifted to a setting for driving the vehicle in said opposite direction, whereby the vehicle may be driven in said opposite direction without interference from said clutch and brake.

3. In a motor vehicle having a brake, a transmission including a shaft, an overrunning clutch carried thereby, said clutch including an overrunning part constituting a pinion, brake operating instrumentalities including a shiftable rack for cooperating with said pinion, whereby, when the transmission is set for driving the vehicle in one direction and the vehicle starts to move in the opposite direction, said clutch will cause said pinion to move said rack and thereby operate the brake to check such movement of the vehicle, gear shifting means for said transmission, mechanism associated with said rack and said means for withdrawing said rack out of engagement with said pinion when the transmission gearing is shifted to a setting for driving the vehicle in said opposite direction, whereby the vehicle may be driven in said opposite direction without interference from said clutch and brake, and means for yieldably holding the rack selectively in either of said two positions.

4. In a motor vehicle, a transmission, a brake, an overrunning clutch associated with a shaft of said transmission and having its parts so arranged that overrunning will take place only when the shaft is rotating in the direction corresponding to a setting of the transmission for driving the vehicle in one direction, instrumentalities for operating said brake, the overrunning part of said clutch being provided with teeth, and said instrumentalities being provided with a pivoted member having a tooth for cooperating with said teeth, whereby, upon movement of said shaft in the opposite direction, said pivoted member will be shifted to cause said instrumentalities to operate said brake.

5. In a motor vehicle, a transmission, a brake, an overrunning clutch associated with a shaft of said transmission and having its parts so arranged that overrunning will take place only when the shaft is rotating in the direction corresponding to a setting of the transmission for driving the vehicle in one direction, instrumentalities for operating said brake, the overrunning part of said clutch being provided with teeth, and said instrumentalities being provided with a pivoted member having a tooth for cooperating with said teeth, whereby, upon movement of said shaft in the opposite direction, said pivoted member will be shifted to cause said instrumentalities to operate said brake, gear shift means for said transmission, and means associated with said gear shift means and said pivoted member for withdrawing the latter from contact with said teeth when said shift sets the transmission for driving the vehicle in the opposite direction.

6. In a motor vehicle, a transmission, a brake, an overrunning clutch associated with a shaft of said transmission and having its parts so arranged that overrunning will take place only when the shaft is rotating in the direction corresponding to a setting of the transmission for driving the vehicle in one direction, instrumentalities for operating said brake, the overrunning part of said clutch being provided with teeth, said instrumentalities being provided with a pivoted member having a tooth for cooperating with said teeth, whereby, upon movement of said shaft in the opposite direction, said pivoted member will be shifted to cause said instrumentalities to operate said brake, gear shift means for said transmission, means associated with said gear shift means and said pivoted member for withdrawing the latter from contact with said teeth when said shift means sets the transmission for driving the vehicle in the opposite direction, and a lost-motion connection between said pivoted member and the withdrawing means for allowing said brake to be released.

7. In a motor vehicle having a brake, a transmission, an overrunning clutch associated with a shaft of said transmission and arranged so that overrunning will take place only when the shaft is rotating in the direction corresponding to a setting of the transmission for driving the vehicle in one direction, and brake operating means for the vehicle, the overrunning part of said clutch being provided with teeth, and said means including a tooth for cooperating with said teeth, whereby, upon movement of said shaft in the opposite direction, said tooth will be shifted by said part to cause said means to operate the brake.

8. In a motor vehicle having a brake, a transmission, an overrunning clutch associated with a shaft of said transmission and arranged so that overrunning will take place only when the shaft is rotating in the direction corresponding to a setting of the transmission for driving the vehicle in one direction, brake operating means for the vehicle, the overrunning part of said clutch being provided with teeth, and said means including a toothed member for cooperating with said teeth, whereby, upon movement of said shaft in the opposite direction, said toothed member will be shifted by said part to cause said means to operate the brake, gear shift means for said transmission, and instrumentalities associated with said gear shift means and said member for separating said member from said teeth when said shift means sets the transmission for driving the vehicle in the opposite direction.

9. In the drive system of a motor vehicle, a change speed transmission having a shaft adapted to be rotated in a clockwise and counterclockwise direction and drivingly connected to the drive wheels of the vehicle, mechanism operatively associated with said shaft and said wheels and operable to lock said wheels for parking purposes, said mechanism comprising a circular member having radially extending teeth and mounted concentric with said shaft, and adapted to rotate therewith in at least one direction, and a pawl-like pivoted member having a tooth complementary to the teeth of said circular member and operable to engage the teeth thereof to lock said wheels for parking purposes, manually operable control means comprising a hand-operated shift means for selectively controlling the operation of said mechanism and said transmission, said mechanism also including a device operatively associated with said shift means and said pivoted member and readily operable in response to operation of said shift means, for controlling the engagement and disengagement of the teeth of said members, the teeth of said members being so shaped that when said teeth are engaged and there is a torque force acting on said circular member in either a clockwise or counterclockwise direction, there will be a component of this torque force, operable so as to separate the teeth of said members for facilitating the disengagement of said teeth when under load, said device including holding means operable for holding said teeth of said members in engagement against the maximum component of said torque force when said mechanism is operating to lock said wheels, said holding means being adapted to be overcome by operation of said shift means, when said shift means is operated to disengage the teeth of said members, to permit rotation of said wheels in either direction, said pivoted and circular members being disposed so as to operate in the same plane at all times, the path of movement of said tooth of said pivoted member during movement into and out of engagement with the teeth of said circular member being essentially parallel to the line of action of said separating component.

10. In the drive system of a motor vehicle a change speed transmission and a shaft adapted to be rotated in a clockwise or counterclockwise direction, a rotatable toothed member having radially extending teeth and mounted concentric with said shaft and rotatable therewith in at least one direction, a pawl-like pivoted toothed member having a tooth complementary to the teeth of said rotatable toothed member and adapted to mesh with the teeth of said rotatable toothed member and when so meshed being operable to lock the drive system of the motor vehicle for parking purposes, the teeth of said members being so shaped that when engaged and under a torque load in either a clockwise or counterclockwise direction they will tend to separate, manually operated control means comprising a hand-operated shift means for selectively controlling said transmission, a device operatively associated with said shift means and said pivoted toothed member, and readily operable in response to operation of said shift means for controlling the engagement and disengagement of the teeth of said members, said device including holding means operable for holding said teeth of said members in engagement when under a load resulting from a torque effort on said shaft when said drive system is so locked for parking purposes, said holding means when said drive system is so locked for parking purposes being adapted to be overcome by operation of said shift means, when said shift means is operated to disengage the teeth of said members to permit relative rotation therebetween in either direction, said pivoted and rotatable members being disposed so as to operate in the same plane at all times, the path of movement of said tooth of said pivoted member during movement into and out of engagement with said teeth of said rotatable member being in a direction essentially radial with respect ot the axis of rotation of said rotatable member.

11. A motor vehicle transmission according to claim 10, wherein said device includes cam means operable in response to operation of said control means, for engaging the teeth of said members.

12. In the drive system of a motor vehicle, a change speed transmission and a shaft adapted to be rotated in a clockwise or counterclockwise direction, a rotatable toothed member having radially extending teeth of substantially gear tooth shape and mounted concentric with said shaft and rotatable therewith in at least one direction, a pawl-like pivoted toothed member having a tooth complementary to the teeth of said rotatable toothed member and adapted to mesh with the teeth of said rotatable toothed member and when so meshed being operable to lock the drive system for parking purposes, manually operated control means comprising a hand-operated shift means for selectively controlling said transmission, a device operatively associated with said shift means and said pivoted toothed member, and readily operable in response to operation of said shift means for controlling the engagement and disengagement of the teeth of said members, said device including holding means operable for holding said teeth of said members in engagement against the separating force of the gear teeth resulting from a torque effort on said shaft when said drive system is so locked for parking purposes, said holding means when said drive system is so locked for parking purposes being adapted to be overcome by operation of said shift means, when said shift means is operated to disengage the teeth of said members to permit rotation of said rotatable toothed member and said shaft in either direction relative to said pivoted toothed member, said pivoted and rotatable members being disposed so as to operate in the same plane at all times, the path of movement of said tooth of said pivoted member during movement into and out of engagement with said teeth of said rotatable member being in a direction essentially radial with respect to the axis of rotation of said rotatable member.

13. In a motor vehicle transmission, a drive shaft adapted to be rotated in a clockwise or counterclockwise direction, mechanism including a rotatable toothed member having radially extending teeth of substantially gear tooth shape and mounted concentric with said shaft and rotatable therewith in at least one direction, a pawl-like pivoted member having a tooth complementary to the teeth of said rotatable toothed member and adapted to mesh with the teeth of said rotatable toothed member and when so meshed being operable to lock said drive shaft for parking purposes, manually operable control means comprising a hand-operated shift means for controlling said transmission and operatively associated with said pivoted member and readily operable to control disengagement of the teeth of said members under all load conditions, said shift means also being operable to control the engagement of said teeth, said rotatable toothed member and said shaft being rotatable in either direction when the teeth of said members are disengaged, said pivoted and rotatable members being disposed so as to operate in the same plane at all times, the path of movement of said tooth of said pivoted member during movement into and out of engagement with said teeth of said rotatable member being in a direction essentially radial with respect to the axis of rotation of said rotatable member.

14. In the drive system of a motor vehicle having a change speed transmission and a shaft adapted to be rotated in a clockwise or counterclockwise direction and drivingly connected to the drive wheels of said vehicle, mechanism operatively associated with said shaft and said wheels and cooperable therewith to lock the wheels of the vehicle for parking purposes, said mechanism comprising a rotatable toothed member having radially extending teeth of substantially gear tooth shape, and mounted concentric with said shaft and rotatable therewith in at least one direction, a pawl-like pivoted toothed member having a tooth complementary to the teeth of said rotatable toothed member and adapted to mesh with the teeth of said rotatable toothed member, and when so meshed said mechanism will operate to lock said wheels for parking purposes, manually operable control means comprising a hand-operated shift means for selectively controlling said transmission, said mechanism also including a device operatively associated with said shift means and said pivoted member, and readily operable in response to operation of said shift means to control the engagement and disengagement of the teeth of said members, said device being operable when the teeth of said members are in engagement, to prevent the disengagement of said teeth under the influence of the force tending to separate said teeth resulting from the shape of the teeth on said rotatable member, when said mechanism is operating to lock said wheels for parking purposes, said pivoted and rotatable members being disposed so as to operate in the same plane at all times, the path of movement of said tooth of said pivoted member during movement into and out of engagement with said teeth of said rotatable member being in a direction essentially radial with respect to the axis of rotation of said rotatable member.

References Cited in the file of this patent

UNITED STATES PATENTS

| | | |
|---|---|---|
| 2,135,897 | Jameson | Nov. 8, 1938 |
| 2,296,619 | Rauen | Sept. 22, 1942 |